(Model.)
M. L. CONNETT.
CALIPERS AND DIVIDERS.
No. 409,828. Patented Aug. 27, 1889.
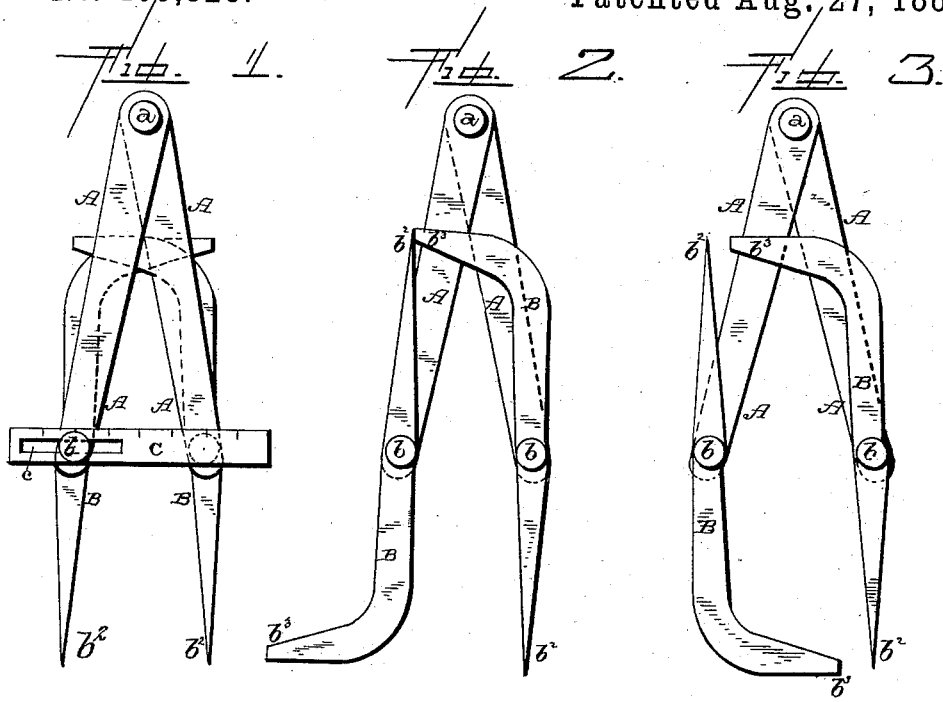
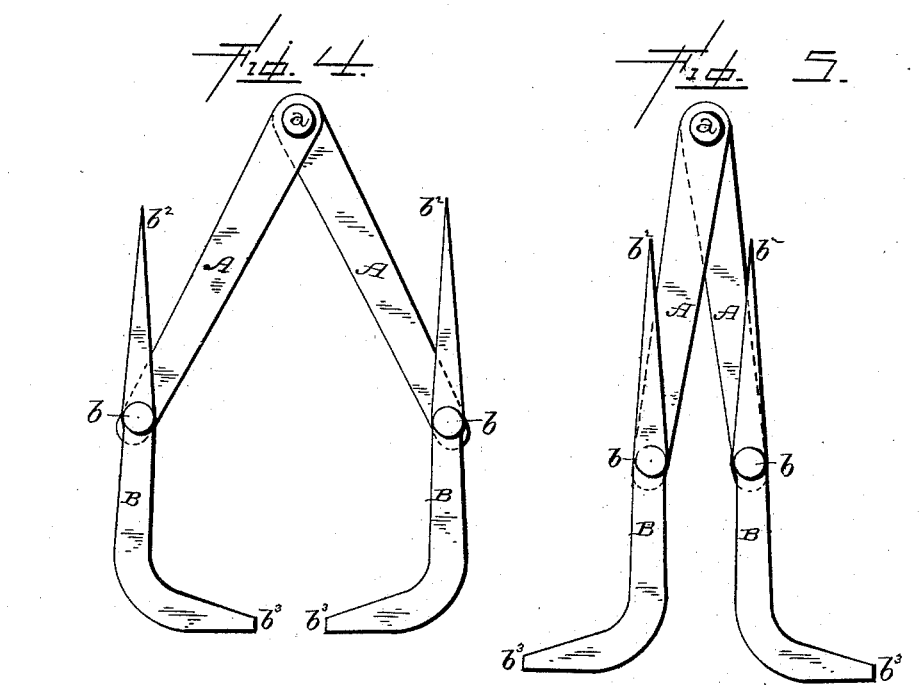
Witnesses
L. K. Gardner
Edm. P. Ellis
Inventor
M. L. Connett,
per F. A. Lehmann, atty

United States Patent Office.

MARTIN LUTHER CONNETT, OF BELLEFONTAINE, OHIO.

CALIPERS AND DIVIDERS.

SPECIFICATION forming part of Letters Patent No. 409,823, dated August 27, 1889.

Application filed May 13, 1887. Serial No. 238,052. (Model.)

*To all whom it may concern:*

Be it known that I, MARTIN LUTHER CONNETT, of Bellefontaine, in the county of Logan and State of Ohio, have invented certain new and useful Improvements in Calipers and Dividers; and I do hereby declare the following to be a full, clear, and exact description of the invention, such as will enable others skilled in the art to which it pertains to make and use it, reference being had to the accompanying drawings, which form part of this specification.

My invention relates to an improvement in calipers and dividers; and it consists in, first, the combination of the two pivoted bars, each having a divider and a caliper-arm pivoted thereto; second, the combination of the two bars pivoted together, and each having a divider and caliper-arm pivoted at or about its center to the free end of the said bars, and, third, the combination of the two bars and two arms having pivoted and bent ends pivoted thereto, all of which will be more fully described hereinafter.

The object of my invention is to combine in a single tool a caliper and a divider, and thereby produce a tool which is especially adapted for mechanics.

The several figures are plan views of my improvement, showing the several positions into which the parts can be adjusted, the same letters of reference indicating similar parts in all the figures.

Referring by letter to the drawings, A represents two bars pivoted together by the rivet or set-screw $a$. To the free ends of the said bars are pivoted by the rivets or set-screws $b$ the divider and caliper-arms B. Each arm B is formed with a pointed end $b^2$ and a circular or caliper end $b^3$, and is pivoted to the bars A at about the middle of its length. To one bar A, and by the rivet or set-screw $b$ which pivots the divider and caliper-arm to the said bar, is secured the scale C. One end of the scale C is slotted longitudinally, as shown at $c$, to permit of its being adjusted on the bar A, as may be found necessary. In order to enable this scale to be used rapidly and with precision, the centers of the set-screws $b$ are directly over or in a straight line with the points $b^2$. When one of the marks upon the scale is made to register with the center of one of the set-screws, then it can be seen at a glance the distance to the center of the other set-screw, and this will give the distance between the two points. After the points $b^2$ have once been adjusted they can be held rigidly in position by tightening the set-screws $b$, which will prevent any movement of the parts. As but one set-screw $b$ passes through the slot in the scale C, it is only necessary to tighten this one set-screw $b$, when the scale will be held rigidly in position.

When both pointed ends of the arms B are turned down, as shown in Fig. 1, a pair of dividers is formed. By turning one pointed and one caliper end down, the bent end being turned from the pointed end, as shown in Fig. 2, it is converted into a center inside caliper. To change it to a center outside caliper it is only necessary to turn the caliper end so that it will point toward the pointed end, as shown in Fig. 3. To convert it into an outside caliper both the caliper ends are turned down with the ends projecting toward each other, as shown in Fig. 4. When the said caliper ends are turned to point from each other, as shown in Fig. 5, it forms an inside caliper.

Having thus described my invention, what I claim, and desire to secure by Letters Patent, is—

1. Calipers and dividers consisting of two pivoted bars, each having a divider and caliper-arm pivoted thereto, substantially as described.

2. Calipers and dividers consisting of two bars pivoted together, and each having a divider and caliper-arm pivoted at about its center to the free end of the said bars, substantially as herein shown and described.

3. Calipers and dividers consisting of two pivoted bars and two arms having pointed and bent ends pivoted to the free ends of the said bars, substantially as described.

In testimony whereof I affix my signature in presence of two witnesses.

MARTIN LUTHER CONNETT.

Witnesses:
 J. O. SWEET,
 J. A. HUSTON.